Patented Nov. 14, 1950

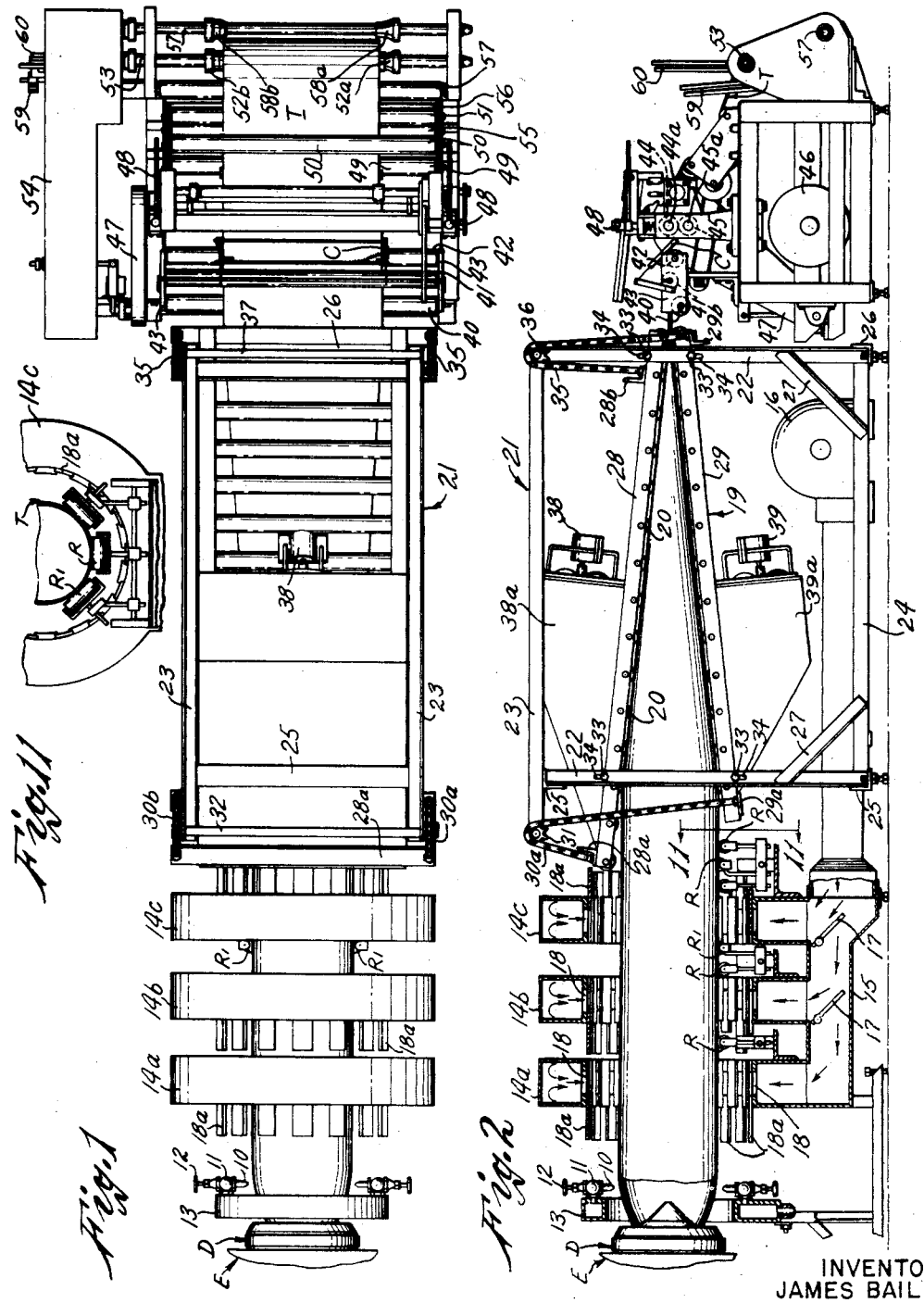

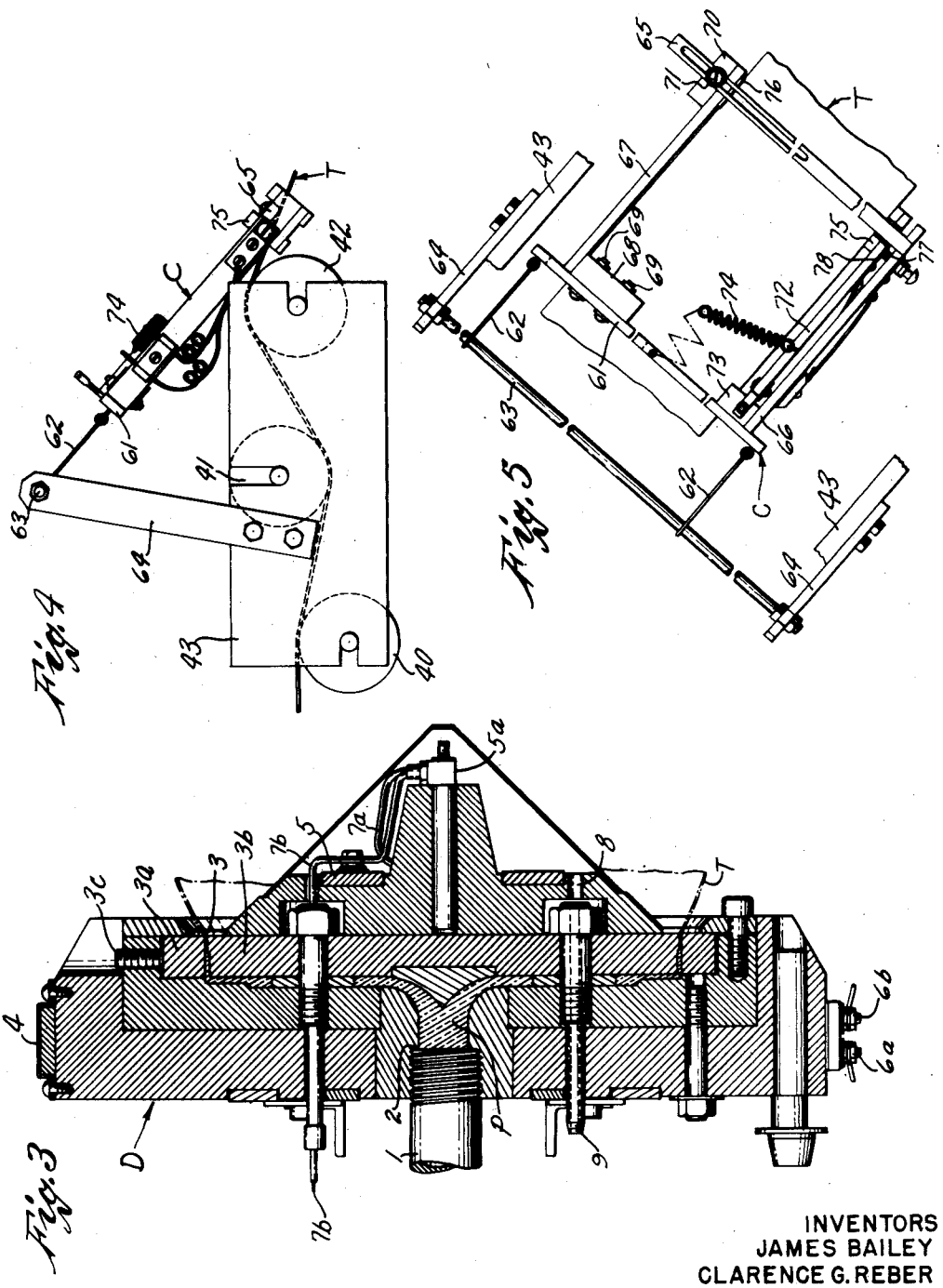

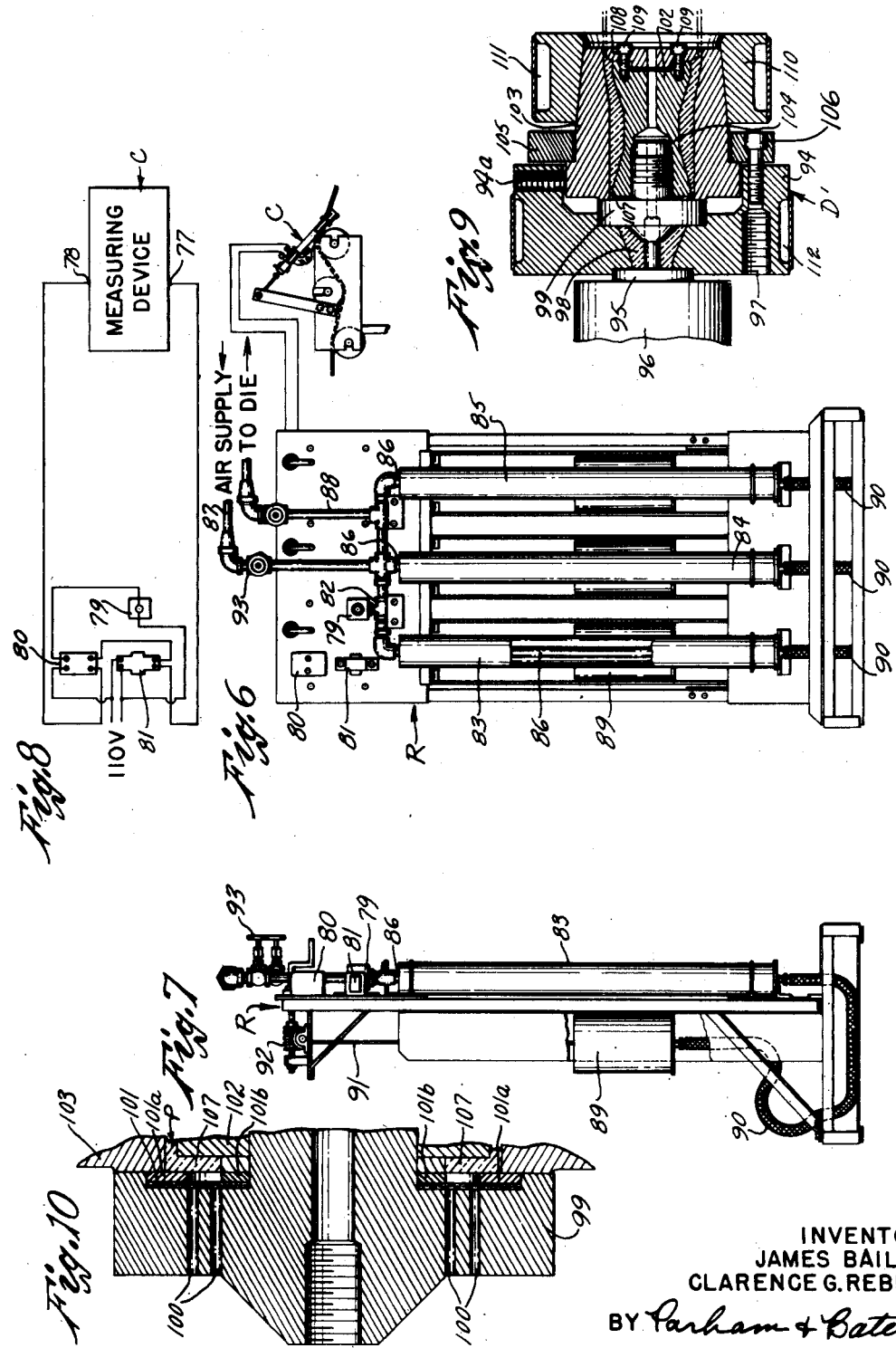

2,529,897

UNITED STATES PATENT OFFICE 2,529,897

PROCESS OF AND APPARATUS FOR MANUFACTURING THIN WALL TUBING

James Bailey, West Hartford, and Clarence G. Reber, Newington, Conn., assignors to Plax Corporation, Hartford, Conn., a corporation of Delaware Application January 17, 1948, Serial No. 2,936

19 Claims. (Cl. 18—14)

The present invention relates to the manufacture of thin wall tubing from thermoplastic materials in a plastic condition generally referred to as solvent-free. Polyethylene is an example of one such material which, under suitable temperature and pressure conditions, can be worked into desired shapes or objects without an excess of solvent and without a drying or curing step such as is necessary when an excess of solvent is employed to render the material plastic.

There is a large demand in the packaging and related fields for flexible plastic tubing having a wall thickness of a few thousandths of an inch and in widths, when collapsed, ranging from a few inches to several feet. Considerable difficulty has been experienced in the past in supplying this demand and, in particular, in satisfying the close tolerance requirements which include holding to uniform thickness and to uniform collapsed width.

In the manufacture of such tubing by the solvent-free extrusion of a heat softened thermoplastic, it is desirable to maintain air pressure within the tubing to prevent collapse and internal sticking and also to expand the tubing to a desired size within a permissive range using the same extrusion nozzle. Heretofore, it has been found extremely difficult to control the factors of temperature and uniform wall thickness as well as uniformity of fluid expansion pressure because each of these factors in a large measure is influenced by the others.

It is an object of the present invention to provide a process of and apparatus for manufacturing collapsed thermoplastic tubing which overcome or substantially lessen the above-mentioned as well as other attendant difficulties.

Other objects and advantages will be apparent to those skilled in the art from the following detailed description of an embodiment of the invention.

The process of the invention in general comprises extruding a hot thin wall thermoplastic tubing, controlling the temperature of the extruded tubing, expanding by fluid pressure the portion of the tubing thus controlled as to temperature, cooling and setting the expanded tubing, collapsing the tubing to a substantially wrinkle-free, collapsed condition and controlling the fluid expansion pressure responsively to the width of the collapsed tubing.

The invention accordingly includes the above-mentioned several steps and the relation of one or more of those steps to each of the others, as well as the apparatus for performing the steps in proper relationship substantially as exemplified in the apparatus and its mode of operation hereinafter disclosed and claimed.

For a more detailed description of the invention, reference is made to the attached drawings in which:

Fig. 1 is a plan view of apparatus for producing collapsed tubing in accordance with the invention;

Fig. 2 is a side elevation, partly in cross-section, of the apparatus illustrated in Fig. 1;

Fig. 3 is a large cross-sectional view of the extrusion head portion of the apparatus shown in Figs. 1 and 2;

Fig. 4 is an enlarged view of control mechanism shown in Fig. 1 which is responsive to variation in width of the collapsed tubing;

Fig. 5 is a plan view of the control mechanism illustrated in Fig. 4;

Fig. 6 is a front elevation of the fluid pressure control apparatus responsive to the control mechanism illustrated in Figs. 4 and 5;

Fig. 7 is a side elevation view of the fluid pressure control apparatus shown in Fig. 6;

Fig. 8 is a wiring diagram for the control apparatus shown in Fig. 6;

Fig. 9 is a view similar Fig. 3 of a modified type of extrusion nozzle;

Fig. 10 is a cross-sectional view of the homogenizing element of the nozzle shown in Fig. 9; and Fig. 11 is a view taken along line 11—11 of Fig. 2 showing supporting rolls for the tubing.

Referring to the drawings and particularly to Figs. 1 and 2, the illustrated embodiment of the present invention includes a tubing die D from which a thin wall tubing may be continuously extruded. A suitable extruder mechanism including heating, homogenizing, and pressure producing parts or components are, of course, provided for forcing a solvent-free plastic through the die D under optimum extrusion conditions of temperature, pressure and homogeneity. The die D is shown secured to the outlet end 1 (Fig. 3) of an extruder E which is fragmentarily shown in Figs. 1 and 2.

As best seen in Fig. 3, the die D includes a threaded inlet 2 for receiving the heated plastic P from the extruder outlet 1 and a composite annular extrusion orifice or nozzle 3 including an outer annular member 3a and inner circular member 3b from between which the plastic P is extruded in the form of tubing T. The outer member 3a is coaxially adjusted relative to the inner member 3b by means of adjustment screws 3c.

The die D may also include electrical heating elements 4 and 5 for controlling the temperature of the plastic therein. Terminals 6a and 6b supply current to the outer heating element 4 and similar connections 7a and 7b including a thermoswitch 5a supply current to the inner heating element 5.

The die D also includes a pressure outlet 8 through which a suitable fluid as, for example, air is introduced to maintain a desired pressure within the tubing T. In the illustrated embodiment the outlet 8 is supplied with air by a line 9 from a source of supply which is controlled responsively to variations in the size of the tubing as hereinafter will be explained more in detail.

Upon leaving the die D the extruded tubing T is air cooled as it passes through a ring or circle of fishtail, gas-burner type, jets 10 (Figs. 1 and 2) which are mounted on ball joints 11. Manually operated needle valves 12 individually control a supply of cooling air to the jets 10 from a circular manifold 13 connected with a compressed air supply.

While for clarity of illustration only two of the jets 10 are illustrated in the drawings, in actual practice, a much larger number, as for example, 20 are provided at equally spaced intervals about the manifold ring 13. The air from the jets 10 reduces the temperature and, consequently, the plasticity of the extruded tubing.

Differential regulation of the several jets serves to control uniformity of thickness of the blown tubing. Thus, when the tubing is blowing up unevenly and a thin streak develops, a little more air from the jet 10 overlying this particular streak gives additional chilling to that portion of the tubing. The additional chilling reduces expansion and thinning of the underlying portion of the tube and greater uniformity of thickness is obtained.

The tubing T next passes through a series of wind boxes designed to further cool and "freeze" or set the tubing. The wind boxes, three of which are illustrated in Figs. 1 and 2, consist of three like annular chambers 14a, 14b, 14c, which are supplied with air under pressure of a few inches of water from a common manifold 15 and blower 16. The supply of air to each wind box may be individually controlled by means of dampers 17 located in the manifold 15. The air thus supplied to the wind boxes is discharged into contact with the tubing T through a series of openings 18, which are located at spaced intervals in the inner peripheral wall of each wind box and individually regulated in size by sliding dampers 18a.

A series of freely rotatable rolls R and R¹ are preferably employed to support large diameter tubing centrally of the annular wind boxes. For this purpose the rolls R may be horizontally disposed and the rolls R¹ angularly disposed so as to provide both support and lateral guidance substantially as shown in Figs. 1, 2, and 11.

After passing through the wind boxes, the tubing is ironed down to a flat or collapsed double sheet by an assembly, designated generally by the numeral 19, which includes a series of metal rollers 20 located transversely of the tubing along two converging lines above and below the tubing.

Referring more particularly to the details of the tube collapsing roller assembly 19, there is provided a frame generally designated 21 including four vertical corner posts 22 secured in spaced relationship by upper and lower longitudinal frame members 23 and 24 and by fore and aft transverse members 25 and 26. Corner braces 27 give the frame 21 necessary rigidity. The rollers 20 are journalled in pairs of upper and lower longitudinal frame members 28 and 29, respectively, the upper pair of frame members 28 being secured in proper spaced relation by fore and aft transverse members 28a and 28b and the lower pair of frame members 29 being similarly secured by fore and aft transverse members 29a and 29b. The forward end of the roller frames 28 and 29 are supported by the ends of chains 30a, 30b, the latter being supported by sprockets 31 secured at the end of a shaft 32 rotatably mounted in the forward ends of the members 23. Clockwise rotation (Fig. 2) of the sprockets 31 operates chains 30a, 30b, so as to raise the forward end of the upper roller frame 28 and simultaneously lower the forward end of the lower roller frame 29 approximately a like amount so as to enlarge the distance therebetween. As is apparent from the drawings, counterclockwise rotation of the sprocket 31 reduces the distance between the upper and lower roller frame members 28 and 29.

The aft ends of the frame members 28 and 29 are similarly supported by chains 35 which engage sprockets 36 secured to the ends of the transverse shaft 37 rotatably journalled rearwardly in the longitudinal frame members 23. The members 28 and 29 may be secured in a desired position of adjustment by bolts 33 which extend through vertical adjustment slots 34 in the forward vertical frame members 22 and are tapped in the members 28 and 29.

In order to assure sufficient cooling of the tubing and thus prevent sticking to the rollers 20, additional cooling apparatus is provided by like upper and lower blowers 38 and 39 which, respectively, are mounted on the upper and lower frames 28 and 29 and the air from which is directed by suitable ducts 38a and 39a towards both upstream banks of upper and lower rollers 20 and the portion of the tubing engaged thereby.

From the rollers 20 the collapsed tube T passes to a group of three idler rollers 40, 41 and 42 which are rotatably mounted transversely of the tube in spaced side members 43 of a suitable frame for the idler roll assembly. The axes of rotation of the rollers 40 and 42 are slightly below and at either side of roller 41 so that as the collapsed tube passes over the two outside rollers and under the inner roller, each of the rollers is engaged and rotated by the tube. The rollers act to eliminate wrinkles and at the same time prevent blowing up of the tube.

The tube is next drawn by a pair of pulling rollers 44, 45 axially secured on shafts 44a and 45a, respectively, through a device C, described more in detail hereinafter, for controlling the air pressure introduced into the tube through the outlet 8, responsively to variations in width of the collapsed tube as it passes therethrough.

The lower shaft 45a is positively driven as by motor 46 and suitable connecting drive (not shown) within the chain guard 47. Tension adjustments 48 are provided for varying the amount of pressure with which the upper or idler roller 44 bears on the drive roller 45.

The collapsed tube is drawn from the pulling rollers 44, 45 through a series of smoothing rolls 49, 50 and 51 and wound on end reels or spools 52a, 52b which are mounted on shaft 53 of a winder. The drive for the shaft 53 is preferably through a friction clutch (not shown) within the housing 54 so that slippage occurs when the clutch speed exceeds the speed at which the tube is supplied to the reels 52a, 52b. This arrangement assures rolling of the tube in substantially uniform tension on to the reels regardless of variations in the size of the reels and of the rate at which the tube is supplied to the roll. It will be seen that the smoothing rolls 49, 50 and 51 about which the tube is festooned also act to relieve the portion of the tube immediately downstream of the pulling rollers 44, 45 from the greater portion of the tension exerted by the reels 52a, 52b. Additional festooning rolls 55 and 56 are also provided and may be used if additional ironing and festooning action is desired.

An alternate winding shaft 57 carrying winding reels 58a, 58b is provided for receiving the tube when the roll on spools 52a, 52b attain a desired size and weight. Manually operable levers 59 and 60 are provided for engaging and disengaging the shafts 53 and 57 from the common drive within the housing 54.

Referring more particularly to the device C for controlling the diameter of the tube responsively to the width of the collapsed tube passing therethrough, the device, as best seen in Figs. 4 and 5, includes a generally rectangular frame, the upper leg or side 61 of which is disposed transversely of the tubing T and secured as by wires 62 to a rod 63 which itself is secured transversely of the tube to a pair of uprights 64 mounted on the side walls 43 of the idler roller frame. The lower leg or side 65 of the frame rests on and is supported by the tubing T. One longitudinal side member 66 of the frame is fixed to one end of the leg 61 and the corresponding end of the leg 65. The fourth leg or side 67 of the frame is secured at one end to a block 68, which is adjustably secured to a slotted portion of the frame member 61 by fasteners 69. The opposite end of the member 67 similarly is secured to a block 70 which is adjustably secured as by fastener 71 to the slotted end of the lower leg 65. The described construction permits adjustment of the side member 67 of the frame so as to permit adjustment of the width of the frame between members 66 and 67. Thus when a change in the collapsed width of tubing is required, the width of the frame may be adjusted to accommodate the width of the tubing.

Disposed adjacent and generally parallel to the side member 66 is a second side arm 72 which is pivotally secured at its upper end to a block 73 in the corner of the frame. As illustrated in Fig. 5, a light spring 74 acts to draw the pivotally mounted side arm 72 inwardly so that a stop 75 carried on the lower end presses against the adjacent edge of the collapsed tube T and keeps the opposite edge of the tube pressed against a similar stop 76 carried by the frame leg 67. A pair of electrical contact buttons 77, 78 respectively mounted on members 66 and 72 are forced into engagement whenever the width of the tubing T between stops 75 and 76 exceeds a desired maximum and are disengaged by the action of spring 74 when the width of the tubing is less than that maximum.

The thus detected variations in width of the collapsed tubing T passing through the automatic measuring device C, are translated by means of an air pressure regulator R (Figs. 6 to 8, inclusive) into automatic control of the amount of air pressure introduced at the die through inlet 8 into the tubing T, thereby automatically controlling the size to which the tube is blown responsively to variations in width of the collapsed tube. More particularly, the air pressure is increased when the width of the collapsed tube passing between the control mechanism stops 75 and 76 falls below a desired minimum, and is decreased when the width of the tube exceeds the permitted maximum.

Fig. 8 illustrates a suitable wiring diagram for the electrical contacts 77 and 78 which are so arranged that when contact is made or broken, a solenoid 79 is energized or de-energized through a relay 80 and a transformer 81. The solenoid 79 controls through a valve 82 the air pressure regulator R (Figs. 6 and 7) which supplies air pressure through the die into the tube.

Inasmuch as the tubing T is extremely sensitive to small variations in pressure, the pressure regulator R must be capable of controlling pressure within extremely small limits, measurable in fractional inches of water. To this end, the regulator is provided with three vertical containers 83, 84 and 85 each of which contains an air pipe 86, the lower end of each extends well into its container while the upper ends are connected to a common supply line 87. The connection to the air pipe in the container 83 is made through the valve 82, the communication being open when the solenoid is energized and closed when the solenoid is de-energized. Between the valve 82 and the air supply line 87, the connections to the several air pipes freely communicate with each other and with a line 88 which is connected to the pressure supply pipe in the die D. The air pressure supplied from the line 87 to the die through the line 88 is controlled by placing on the lower end of the air pipe in the container 83 a back pressure equal to the minimum air pressure desired at the die, and on the air pipe in the containers 84 and 85 a back pressure equal to the maximum pressure desired at the die. Thus, the line 88 always is bled of any pressure in excess of the maximum desired at the die and when the maximum pressure expands the tubing T beyond the desired maximum, the attendant closing of the contacts 77, 78 and energizing of the solenoid opens the valve 82 and bleeds the air pressure to the minimum established on the air pipe in the container 83.

In order to place the desired pressures on each air pipe, each of the containers is supplied with a head of water to a height above the lower end of its air pipe equal to the pressure in inches of water desired. The water in each container is supplied by means of its own reservoir 89 to which the containers are connected by flexible tubes 90. The height of each reservoir can be adjusted readily by means of support ropes 91 and manually operable windlasses 92 so as to establish the desired head of water on each air pipe. The height of water established in the containers 84 and 85 is just enough greater than the height of the water in the container 83 to slowly increase the size of the tubing T when the valve 82 is closed, whereas the height of the water in the tube 83 is just enough lower to slowly decrease the size of the tube when the valve 82 is open.

In addition to the fine pressure adjustment thus provided, a coarser preliminary adjustment may be provided as by means of a manually operable valve 93 in the supply line 87.

Fig. 9 illustrates a modified die D' which has been found particularly satisfactory for producing tube free from "grain" or heavy spider lines which sometimes are produced in the product. These lines are the result of dividing the plastic stream into multiple subdivisions, as by a spider or other form of homogenizer and, thereafter, reuniting the subdivisions into a single stream. The re-amalgamation does not always produce a homogenous stream, lines of reunion being apparent in the product. This undesirable result is avoided in the die D' which includes a cylindrical die holder or housing 94 securable to the nozzle 95 of an extruder 96, as by means of bolts (not shown) secured in tapped holes 97 in the housing. Plastic from the extruder nozzle 95 is distributed by a conical passageway 98 into a plurality of subdivided passageways in a homogenizing spider 99.

In the embodiment illustrated in Figs. 9 and 10, the subdivided passageways comprise a pair of concentric rings of closely drilled holes 100, the downstream ends of which are covered by a ring of screening 101 of approximately 80–80 mesh which is secured in place by washers 101a and 101b and which effectively filters out the heavy spider lines which otherwise might be produced by the coarser dividing passageways 100. From the screen, the plastic passes into an annular nozzle chamber defined by an inner nozzle member 102 and an outer nozzle member 103. The inner nozzle member is generally spool shaped and is co-axially disposed and secured on the threaded stud portion 104 of the spider 99. The outer portion 103 of the nozzle comprises an annular ring co-extensive with and co-axially disposed relative to the inner member 102 and is secured in the housing 94 by means of a retaining ring 105 and bolts 106. The upstream end of the member 103 seats snugly against the spider 99.

A series of adjustment screws 94a circumferentially spaced about the housing 94 extends radially inwardly through tapped holes so that their ends bear on the circumference of the outer nozzle member 103, thus providing means for securing the co-axial adjustment of the inner and outer nozzle members 102, 103 necessary to secure uniformity of thickness in the annular ring or tube of plastic material extruded therebetween.

It will be seen that plastic material, after passing through the screening 101 is discharged into an annular flow restricting chamber 107 formed by the upstream end of the inner nozzle member 102, the stud 104, the outer nozzle member 103 and the spider 99. The flow restricting chamber 107, the outlet from which is an extremely narrow annular passageway between the inner and outer nozzle members 102, 103, serves to maintain adequate back pressure and thus prevent rupture of the screen 101 despite any surging tendency of the plastic which might otherwise establish a rupturing pressure differential on the screen.

As illustrated in Fig. 9, the size of the nozzle passageway increases downstream and then decreases at the outlet to the size necessary to extrude a tube of a desired wall thickness. A replaceable tip 108 secured as by cap screws 109 to the end of the inner nozzle member 102 provides means for readily changing the internal diameter of the nozzle and thus the thickness of the tubing extruded therethrough.

Th temperature of the die D' may be controlled readily. In the arrangement illustrated in Fig. 9, a heating element 110 is pressed on to the outer nozzle member 103, and both the element 110 and the die housing 94 are provided with enclosed annular chambers 111 and 112, respectively, in which suitably controlled electric heating coils may be located.

Having thus described the invention, we claim:

1. The process of forming tubing of thermoplastic material which includes continuously extruding solvent-free thermoplastic material in a plastic condition through an annular die in the form of a tube, collapsing the tubing at a point downstream of said die, introducing fluid pressure into the tube and expanding a portion of the tube between the die and the point of collapse by blowing the tube upstream of said point to a predetermined size larger than its extrusion diameter, and automatically regulating the blowing pressure to maintain said predetermined size.

2. The process of forming tubing of thermoplastic material which includes continuously extruding solvent-free thermoplastic material in a plastic condition through an annular die in the form of a tube, collapsing the tube at a point downstream of said die, introducing fluid pressure into the portion of the tube upstream of said point and blowing the upstream portion of the tube to a predetermined size larger than its extrusion diameter, and automatically regulating the blowing pressure responsively to changes in the size of the collapsed tube passing a point remote from the expanding portion.

3. The process of forming thin-wall tubing of thermoplastic material which includes continuously extruding said material in a heated and plastic condition through an annular die in the form of a tube, placing a greater internal than external pressure on the tube as it is extruded in a heated, deformable condition from the die, expanding said heated portion of the tube by means of the pressure differential between said internal and external pressures to a predetermined greater diameter, cooling said expanded material below its temperature of plasticity and thereby setting said expanded tube, and automatically regulating said pressure differential responsively to changes in the diameter of the expanded tubing to maintain the said predetermined diameter.

4. The process of forming thin-wall tubing of thermoplastic material which includes continuously extruding said material in a heated and plastic condition through an annular die in the form of a tube, placing and maintaining a greater internal than external pressure on the tube as it is extruded in a heated, deformable condition from the die, expanding said heated portion of the tube by means of the pressure differential between said internal and said external pressures to a predetermined greater diameter, cooling said expanded material below its temperature of plasticity and thereby setting the expanded tube, and regulating said cooling differentially about the circumference of the heated tube to differentially control expansion of the tube.

5. The process of forming thin-wall tubing of thermoplastic material which includes continuously extruding said material in a heated and plastic condition through an annular die in the form of a tube, maintaining a greater internal than external pressure on the tube as it is extruded in a heated, deformable condition from the die, expanding said heated portion of the tube by means of the pressure differential between said internal and external pressures to a predetermined greater diameter, cooling said tube, regulating said cooling differentially about the circumference of said expanded tube in accordance with variation in thickness of said tube, and further cooling and thereby setting said tubing while supporting it against lateral displacement relative to its axis of extrusion.

6. The process of forming thin-wall tubing of thermoplastic material which includes continuously extruding said material in a heated and plastic condition through an annular die in the form of a tube, placing and maintaining a greater internal than external fluid pressure on the tube as it is extruded in a heated, deformable condition from the die, expanding said heated portion of the tube by means of the pressure differential between said internal and external pressures to a predetermined greater diameter, cooling said tube, regulating said cooling differentially about the circumference of said expanded tube in accordance with variation in thickness of said tube, further cooling said tubing while supporting it against sagging and lateral displacement relative to its axis of extrusion, and progressively collapsing while maintaining said tube substantially free of wrinkles, automatically regulating the above said pressure differential responsively to variations in the width of the collapsed tube passing a point, and winding said collapsed tubing upon a winding device.

7. The process of forming thin-wall tubing of thermoplastic material which includes continuously extruding said material in a heated and plastic condition through an annular die in the form of a tube, placing and maintaining a greater internal than external pressure on the tube as it is extruded in a heated, deformable condition from the die, expanding said heated portion of the tube by means of the pressure differential between said internal and external pressures to a predetermined greater diameter, and automatically regulating the said pressure differential responsively to variations in the diameter of the tube.

8. The process of forming thin-wall tubing of thermoplastic material which includes continuously extruding said material in a heated and plastic condition through an annular die in the form of a tube, placing and maintaining a greater internal than external fluid pressure on the tube as it is extruded in a heated, deformable condition from the die, expanding said heated portion of the tube by means of the pressure differential between said internal and external pressures to a predetermined greater diameter, cooling said expanding material below its temperature of plasticity and thereby setting said expanded tube, regulating said cooling differentially about the circumference of the expanding tube in accordance with variation in thickness of said tube, further cooling said tubing while supporting it against sagging and lateral displacement relative to its axis of extrusion, progressively collapsing while maintaining said tube substantially free of wrinkles, and automatically regulating the above said pressure differential responsively to variations in the width of the collapsed tube.

9. Apparatus for forming tubing of thermoplastic material including an annular die, an extruder for continuously extruding thermoplastic material from the annular die in the form of a tube, means for introducing fluid pressure into the tube to blow successive portions of the tube to a predetermined size larger than its extrusion diameter, and means for automatically regulating said fluid pressure to maintain said predetermined larger size.

10. Apparatus for forming tubing of thermoplastic material including an annular die, an extruder for continuously extruding heated thermoplastic material from the annular die in the form of a tube, means for collapsing the tube, substantially wrinkle-free, downstream of the die, means for introducing fluid pressure into a portion of the tube upstream of the point of collapse to blow successive portions of the tube to a predetermined size larger than its extrusion diameter and means including a plurality of independently controlled cooling jets for differentially cooling the circumference of the tube adjacent the die.

11. Apparatus for forming tubing of thermoplastic material including an annular die, an extruder for continuously extruding heated thermoplastic material from the annular die in the form of a tube, means for collapsing the tube, substantially wrinkle-free, as it passes a point downstream of the die, means for introducing fluid pressure into the tube to blow successive portions of the tube to a predetermined size larger than its extrusion diameter, means including a plurality of independently controlled cooling jets for differentially cooling the circumference of the tube adjacent the die, and means for automatically regulating the blowing responsively to changes in the size of the collapsed tube as it passes a point remote from the expanding portion.

12. Apparatus for forming tubes of thermoplastic material including an annular die, an extruder for continuously extruding heated thermoplastic material from the annular die in the form of a tube, an adjustable roller assembly for collapsing the tube, substantially wrinkle-free, as it passes a point downstream of the die, means for regulating the angle at which the tube is collapsed by said roller assembly, means for introducing fluid pressure into the tube to blow successive portions of the tube to a predetermined size larger than its extrusion diameter, a circle of independently regulable cooling jets about the tube adjacent the die for differentially cooling the circumference of the tube, an annular wind box through which the tube passes and having a plurality of independently adjustable air ports through which cooling air is directed against the tubing, rollers for supporting said tubing coaxially within said wind box and means for automatically regulating the blowing responsively to changes in the size of the collapsed tube as it passes a point remote from the expanding portion.

13. Apparatus for forming tubing of thermoplastic material including a die having an annular passageway and an outlet nozzle, a screen in said passageway, a flow restricting chamber in said passageway intermediate said screen and nozzle, an extruder for continuously extruding thermoplastic material through and from said nozzle in the form of a tube, means for collapsing the tube, substantially wrinkle-free, as it passes a point downstream of the die, means for introducing fluid pressure into the tube to blow successive portions of the tube to a predetermined size larger than its extrusion, and means for differentially cooling the circumference of the tube adjacent the die.

14. Apparatus for forming tubing of thermoplastic material including a die having an annular passage and an outlet nozzle, a screen in said passage, a flow restricting chamber in said passageway intermediate said screen and nozzle in the form of a tube, means for collapsing the tube, substantially wrinkle-free, as it passes a point downstream of the die, means for introducing fluid pressure into the tube to blow successive portions of the tube to a predetermined size larger than its extrusion diameter, means for differentially cooling the circumference of the tube adjacent the die and means for automatically regulating the blowing responsively to changes in the size of the collapsed tube as it passes a point remote from the expanding portion.

15. Apparatus for forming tubing of thermoplastic material including an annular die, an extruder for continuously extruding thermoplastic material from the annular die in the form of a tube, means for collapsing the tube, substantially wrinkle-free, as it passes a point downstream of the die, means for introducing fluid pressure into the tube to blow successive portions of the tube to a predetermined size larger than its extrusion diameter, means for differentially cooling the circumference of the tube adjacent the die, and means for automatically regulating said fluid pressure between a predetermined maximum and minimum responsively to changes in the size of the collapsed tube as it passes a point remote from the expanding portion.

16. Apparatus for forming tubes of thermoplastic material including an annular die, an extruder for continuously extruding heated thermoplastic material from the annular die in the form of a tube, means for introducing fluid pressure into the tube to blow successive portions of the tube to a predetermined size larger than its extrusion diameter, a circle of independently regulable cooling jets about the tube adjacent the die for differentially cooling the circumference of the tube, an annular wind box through which the tube passes and having a plurality of independently adjustable air ports through which cooling air is directed against the tubing, rollers for supporting said tubing coaxially within said wind box and means for automatically regulating the blowing responsively to changes in the size of the collapsed tube as it passes a point remote from the expanding portion.

17. Apparatus for forming tubes of thermoplastic material including an annular die, an extruder for continuously extruding heated thermoplastic material from the annular die in the form of a tube, means for introducing fluid pressure into the tube to blow successive portions of the tube to a predetermined size larger than its extrusion diameter, an annular wind box through which the tube passes and having a plurality of independently adjustable air ports through which cooling air is directed against the tubing, rollers for supporting said tubing coaxially within said wind box and means for automatically regulating the blowing responsively to changes in the size of the collapsed tube as it passes a point remote from the expanding portion.

18. Apparatus for forming tubes of thermoplastic material including an annular die, an extruder for continuously extruding heated thermoplastic material from the annular die in the form of a tube, means for introducing fluid pressure into the tube to blow successive portions of the tube to a predetermined size larger than its extrusion diameter, an annular wind box through which the tube passes and having a plurality of independently adjustable air ports through which cooling air is directed against the tubing, rollers for supporting said tubing coaxially within said wind box, an adjustable roller assembly for collapsing the tube, substantially wrinkle-free, as it passes a point downstream of the die, means for regulating the angle at which the tube is collapsed by said roller assembly, and means for automatically regulating the blowing responsively to changes in the size of the tube.

19. Apparatus for forming tubes of thermoplastic material including an annular die, an extruder for continuously extruding heated thermoplastic material from the annular die in the form of a tube, an annular wind box through which the tube passes and having a plurality of independently adjustable air ports through which cooling air is directed against the exterior of the tube to set it, rollers for supporting said tube coaxially within said wind box, means for introducing fluid pressure into the tube to blow successive portions of the tube to a predetermined size larger than its extrusion diameter, an adjustable roller assembly for collapsing the tube, substantially wrinkle-free, as it passes a point downstream of the die, means for regulating the angle at which the tube is collapsed by said roller assembly, and means for automatically regulating the blowing responsively to changes in the size of the collapsed tube as it passes a point remote from the expanding portion.

JAMES BAILEY.
CLARENCE G. REBER.

REFERENCES CITED

The following references are of record in the file of this patent:

UNITED STATES PATENTS

| Number | Name | Date |
|---|---|---|
| 2,423,260 | Slaughter | July 1, 1947 |
| 2,433,937 | Tornberg | Jan. 6, 1948 |

FOREIGN PATENTS

| Number | Country | Date |
|---|---|---|
| 431,619 | Great Britain | July 11, 1935 |